(12) United States Patent
Davenport et al.

(10) Patent No.: US 9,441,546 B2
(45) Date of Patent: Sep. 13, 2016

(54) LASER-IGNITION COMBUSTOR FOR GAS TURBINE ENGINE

(71) Applicant: Pratt & Whitney Canada Corp., Longueuil (CA)

(72) Inventors: Nigel Davenport, Hillsburgh (CA); Bhawan Patel, Mississauga (CA); Eduardo Hawie, Woodbridge (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 672 days.

(21) Appl. No.: 13/777,238

(22) Filed: Feb. 26, 2013

(65) Prior Publication Data

US 2014/0237989 A1 Aug. 28, 2014

(51) Int. Cl.
| F02C 7/26 | (2006.01) |
| F02P 23/04 | (2006.01) |
| F02C 7/264 | (2006.01) |
| F02C 7/266 | (2006.01) |
| F23R 3/00 | (2006.01) |
| F23R 3/50 | (2006.01) |

(52) U.S. Cl.
CPC ............... *F02C 7/264* (2013.01); *F02C 7/266* (2013.01); *F02P 23/04* (2013.01); *F23R 3/002* (2013.01); *F23R 3/50* (2013.01); *F23R 2900/00006* (2013.01)

(58) Field of Classification Search
CPC ....... F02P 23/04; F02P 23/045; F02C 7/264; F02C 7/266
See application file for complete search history.

(56) References Cited

U.S. PATENT DOCUMENTS

| 3,427,118 | A | * | 2/1969 | Kuchelbacher | ........... F23Q 7/08 219/121.6 |
| 3,473,879 | A | * | 10/1969 | Berberich | ............... F23C 15/00 123/143 B |
| 4,302,933 | A | | 12/1981 | Smith | |
| 4,416,226 | A | | 11/1983 | Nishida et al. | |
| 4,434,753 | A | | 3/1984 | Mukainakano et al. | |
| 4,726,336 | A | * | 2/1988 | Hoppie | ................... F02P 23/04 123/143 B |
| 4,947,640 | A | | 8/1990 | Few et al. | |
| 5,367,869 | A | | 11/1994 | DeFreitas | |
| 5,404,712 | A | * | 4/1995 | Few | ........................ F02C 7/264 60/39.821 |

(Continued)

FOREIGN PATENT DOCUMENTS

| EP | 2458177 | 5/2012 |
| EP | 2461004 | 6/2012 |
| WO | WO01/69136 | 9/2001 |

OTHER PUBLICATIONS

European Search Report for corresponding EP Application No. 14156002, issued Jun. 30, 2014.

*Primary Examiner* — Phutthiwat Wongwian
*Assistant Examiner* — Rene Ford
(74) *Attorney, Agent, or Firm* — Norton Rose Fulbright Canada LLP

(57) ABSTRACT

The combustor has a laser ignitor mounted to the casing, remotely from the liner of the combustion chamber. The laser ignitor has an igniter beam path for igniting the fuel and air mixture in the combustion chamber, the igniter beam path extending at least partially across the air plenum surrounding the liner and into the combustion chamber through a corresponding beam path aperture provided in the liner.

14 Claims, 2 Drawing Sheets

(56) References Cited

U.S. PATENT DOCUMENTS

| | | | | |
|---|---|---|---|---|
| 5,497,612 | A | 3/1996 | Few et al. | |
| 5,515,681 | A * | 5/1996 | DeFreitas | F23Q 13/00 60/39.821 |
| 5,524,429 | A | 6/1996 | Few et al. | |
| 5,542,247 | A * | 8/1996 | Bushman | F02K 7/00 60/203.1 |
| 5,598,699 | A | 2/1997 | Few et al. | |
| 5,628,180 | A | 5/1997 | DeFreitas | |
| 5,673,554 | A * | 10/1997 | DeFreitas | F02P 23/045 102/200 |
| 5,689,949 | A * | 11/1997 | DeFreitas | F02C 7/264 219/121.36 |
| 5,756,924 | A | 5/1998 | Early | |
| 5,845,480 | A | 12/1998 | DeFreitas et al. | |
| 5,876,195 | A | 3/1999 | Early | |
| 5,983,871 | A | 11/1999 | Gordon et al. | |
| 6,302,682 | B1 | 10/2001 | Early et al. | |
| 6,382,957 | B1 | 5/2002 | Early et al. | |
| 6,413,077 | B1 | 7/2002 | Early et al. | |
| 6,428,307 | B1 | 8/2002 | Early et al. | |
| 6,514,069 | B1 | 2/2003 | Early et al. | |
| 6,676,402 | B1 | 1/2004 | Early et al. | |
| 6,796,278 | B2 * | 9/2004 | Ryan, III | F02B 23/104 123/143 B |
| 7,080,504 | B2 * | 7/2006 | Pais | F02C 7/264 60/203.1 |
| 7,420,662 | B2 | 9/2008 | Yalin et al. | |
| 7,559,203 | B2 * | 7/2009 | Stastny | F23R 3/60 60/796 |
| 7,661,401 | B2 | 2/2010 | Anezaki et al. | |
| 7,770,552 | B2 | 8/2010 | Schultz | |
| 7,784,287 | B2 | 8/2010 | Badding et al. | |
| 8,127,732 | B2 | 3/2012 | Kopecek et al. | |
| 8,616,006 | B2 * | 12/2013 | Rocci Denis | F02C 7/24 60/39.821 |
| 8,689,536 | B2 * | 4/2014 | Kopacek | F02C 7/264 356/317 |
| 2006/0032471 | A1 * | 2/2006 | Yalin | F02P 23/04 123/143 B |
| 2006/0037572 | A1 * | 2/2006 | Yalin | F02D 35/022 123/143 B |
| 2007/0280304 | A1 | 12/2007 | Deile et al. | |
| 2009/0282805 | A1 * | 11/2009 | Kopecek | F02C 7/264 60/39.828 |
| 2010/0031909 | A1 * | 2/2010 | Herden | F02P 17/12 123/143 B |
| 2010/0186368 | A1 * | 7/2010 | Ikeda | F02C 7/264 60/39.821 |
| 2010/0319643 | A1 | 12/2010 | Kopecek et al. | |
| 2011/0239621 | A1 * | 10/2011 | Meneely | F23N 5/16 60/39.281 |
| 2012/0107750 | A1 * | 5/2012 | Krull | F23Q 13/005 431/2 |
| 2012/0131926 | A1 | 5/2012 | Kopecek et al. | |
| 2012/0131927 | A1 | 5/2012 | Denis et al. | |
| 2013/0045452 | A1 * | 2/2013 | Costa | F02C 7/264 431/254 |
| 2014/0237989 | A1 * | 8/2014 | Davenport | F23R 3/002 60/39.821 |
| 2014/0238038 | A1 * | 8/2014 | Macchia | F02C 7/264 60/778 |

* cited by examiner

LASER-IGNITION COMBUSTOR FOR GAS TURBINE ENGINE

TECHNICAL FIELD

The application relates generally to gas turbine engines and, more particularly, to combustors therefore which have laser igniters.

BACKGROUND OF THE ART

Spark plugs have been the traditional means to ignite the fuel/air mixture inside combustion chambers of gas turbine engines for many decades. The spark plugs were housed in struts extending across the compressed air plenum, between the combustor casing and the combustion chamber liner. The liner is subjected to extreme high temperatures and associated thermal growth whereas the casing is subjected to relatively cool compressed air and therefore to much less thermal growth. The end of the strut mounted to the liner needed to accommodate the relative thermal growth of the liner, which was achieved by a floating collar but nonetheless produced fretting and required regular maintenance.

In more recent years, spark plugs have been replaced by laser igniters. The laser igniters were at least partially housed in the strut and typically had a focusing lens, or window, exposed to soot from the combustion chamber. Henceforth, although the laser igniters procured some advantages over spark plugs, they continued to require maintenance, such as maintenance required from the fretting of the strut and exposure of optical components to soot. Accordingly, there remained room for improvement in addressing the level of maintenance required from the fretting and exposure to soot.

SUMMARY

In one aspect, there is provided a combustor for a gas turbine engine, the combustor comprising: a casing forming a pressure vessel and having an inlet for receiving compressed air; a liner held inside the casing and delimiting a subchamber of the pressure vessel from a plenum extending between the liner and the casing, the liner having a plurality of apertures formed therethrough and allowing controlled fluid flow communication of the compressed air from the plenum into the subchamber, with at least one of the plurality of apertures being a beam path aperture, and an outlet leading to a turbine stage of the gas turbine engine; at least one fuel nozzle mounted to the liner, for injecting fuel into the subchamber; and at least one laser ignitor mounted to the casing, remotely from the liner, the at least one laser ignitor having an igniter beam path for igniting the fuel and air mixture in the subchamber, the igniter beam path extending at least partially across the plenum and into the subchamber through a corresponding one of the at least one beam path apertures in the liner.

In a second aspect, there is provided a gas turbine engine comprising: a compressor section for compressing incoming air, a combustor having a casing forming a pressure vessel and having an inlet for receiving compressed air from the compressor section; a liner held inside the casing and delimiting a subchamber of the pressure vessel from a plenum extending between the liner and the casing, the liner having a plurality of apertures formed therethrough and allowing controlled fluid flow communication of the compressed air from the plenum into the subchamber, with at least one of the plurality of apertures being a beam path aperture, and an outlet; at least one fuel nozzle mounted to the liner, for injecting fuel into the subchamber; at least one laser ignitor mounted to the casing, remotely from the liner, the at least one laser ignitor having an igniter beam path for igniting the fuel and air mixture in the subchamber and generating a hot stream of combustion gasses through the outlet, the igniter beam path extending at least partially across the plenum and into the subchamber through a corresponding one of the at least one beam path apertures in the liner; and a turbine section for extracting energy from the hot stream of combustion gasses, the turbine section being in fluid flow communication with the outlet of the combustor.

In a third aspect, there is provided a combustion chamber for a gas turbine engine, the combustion chamber comprising: a casing forming a pressure vessel and having an inlet for receiving compressed air; a liner held inside the casing and delimiting a subchamber of the pressure vessel from a plenum extending between the liner and the casing, the liner having a plurality of apertures formed therethrough and allowing controlled fluid flow communication of the compressed air from the plenum into the subchamber, with at least one of the plurality of apertures being a beam path aperture, and an outlet leading to a turbine stage of the gas turbine engine; at least one fuel nozzle mounted to the liner, for injecting fuel into the subchamber; at least one laser ignitor window made integral to the casing, at least one laser igniter emitter located externally from the laser ignitor window for generating an igniter laser beam along an igniter beam path, the igniter beam path extending across a corresponding one of the at least one laser ignitor window, at least partially across the plenum, and into the subchamber through a corresponding one of the at least one beam path apertures in the liner, the laser beam path having at least one focussed energy kernel inside the subchamber for igniting the fuel and air mixture.

Further details of these and other aspects of the present invention will be apparent from the detailed description and figures included below.

DESCRIPTION OF THE DRAWINGS

Reference is now made to the accompanying figures, in which.

DETAILED DESCRIPTION

Figure 1:
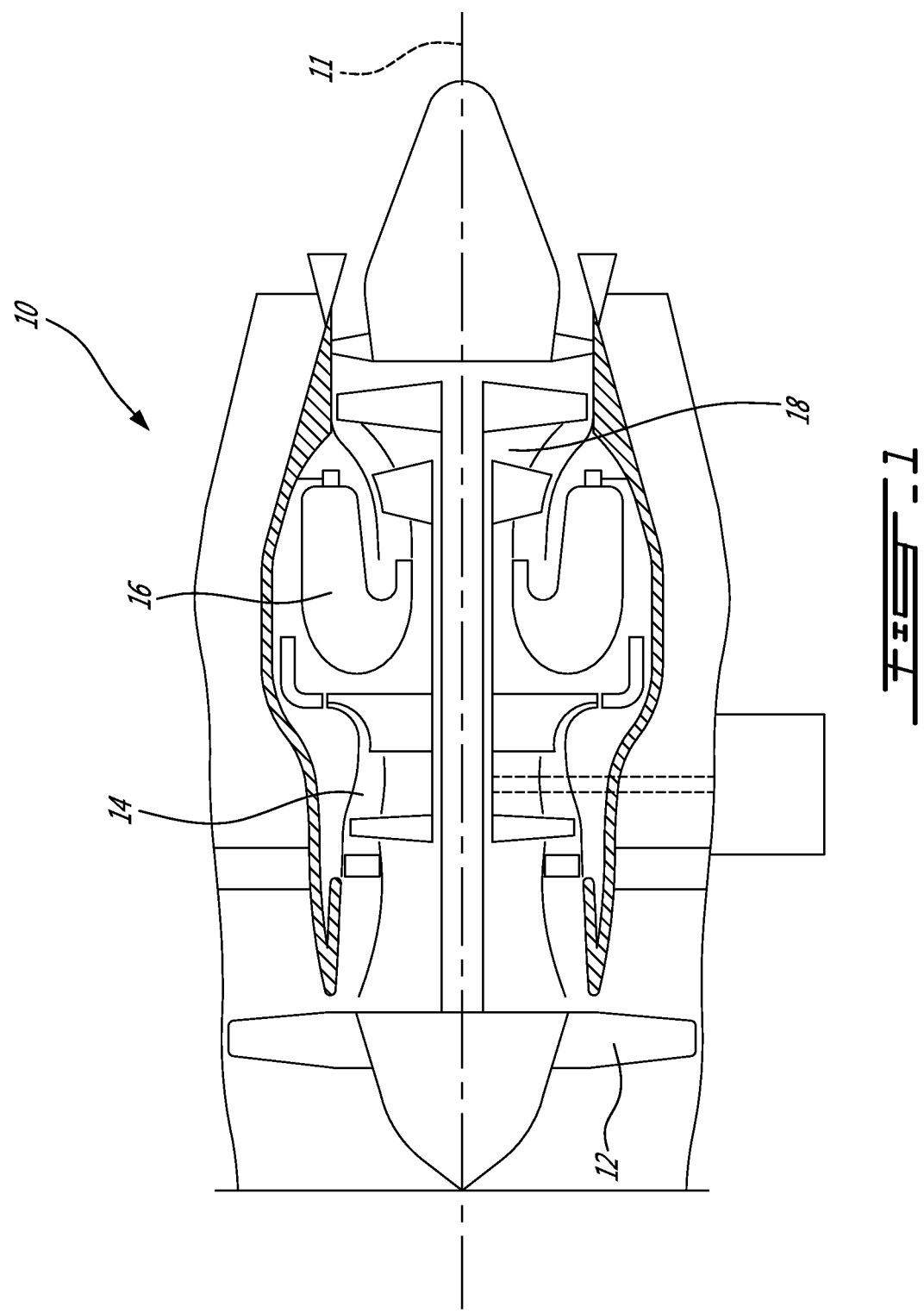
FIG. 1 is a schematic cross-sectional view of a gas turbine engine.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. The fan 12, compressor 14, combustor 16 and turbine section 18 are generally annular around a main axis 11 of the gas turbine engine 10.

Figure 2:
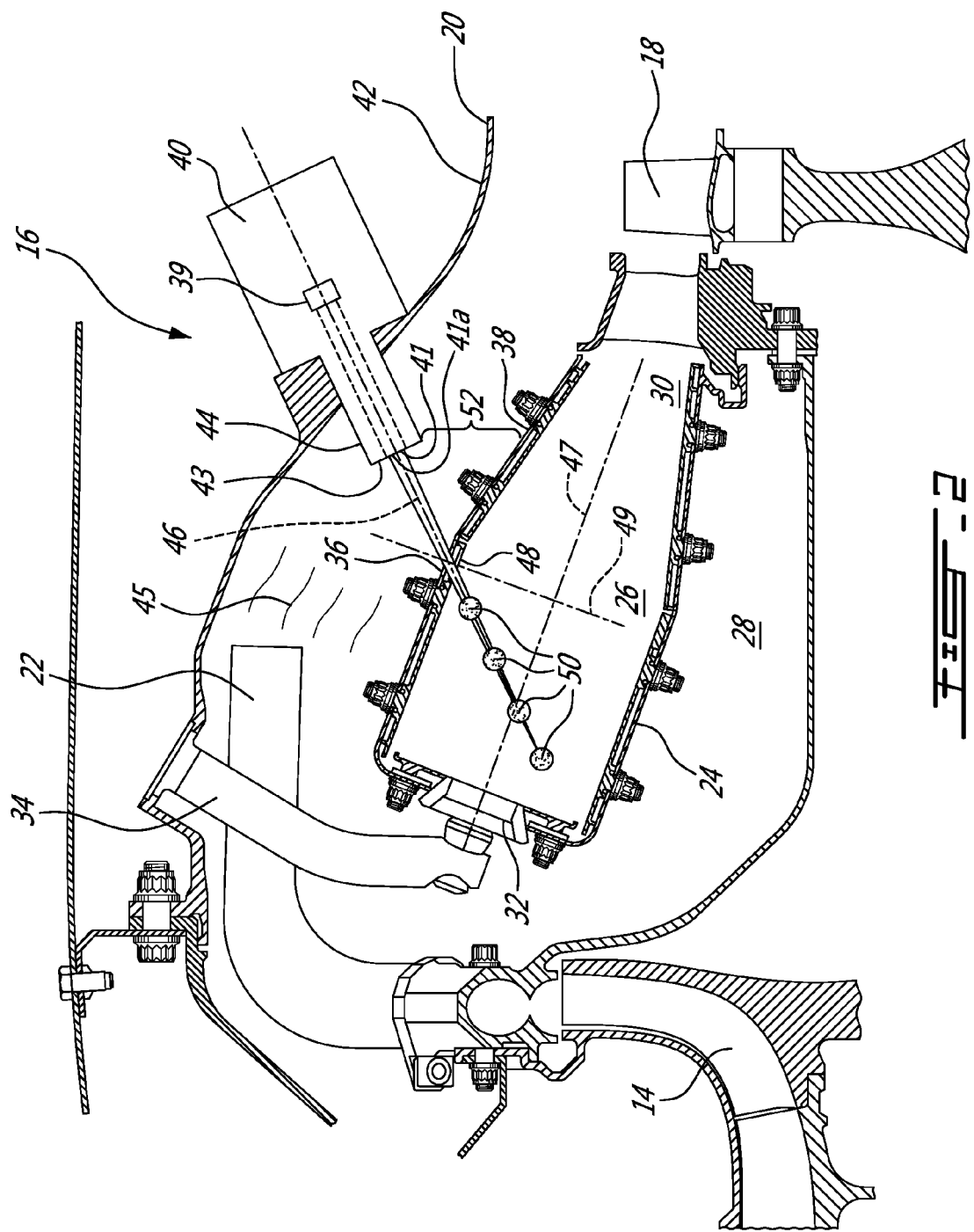
FIG. 2 is a cross-sectional view of a combustor of a gas turbine engine.

The enlarged view provided in FIG. 2 shows a combustor 16 in greater detail. More particularly, as can be seen in the figure, the combustor 16 generally includes a case or casing 20 forming an outer shell and serving as a pressure vessel to withstand the important pressure difference which can exist between the compressed air and the environment. To this end, the casing 20 is engineered to be highly leak proof. In the case of the illustrated gas turbine engine 10, the casing 20 has an annular inlet 22 at the front thereof and through which high-pressure compressed air from the compressor 14 is received and diffused.

The combustor 16 also includes a liner 24 which forms a subchamber 26 of the pressure vessel commonly referred to as the combustion chamber. The volume between the liner 24 and the casing 20, where relatively cool compressed air 45 circulates, can be referred to as the plenum 28. In this embodiment, the liner 24 has an annular aperture at the rear forming an outlet 30 of the combustor 16 leading to the turbine section 18. A plurality of circumferentially interspaced fuel nozzles 32 are mounted to the liner 24 to inject fuel into the combustion chamber. In this embodiment, the fuel nozzles 32 are mounted to an end of the liner 24 opposite the outlet 30. The fuel nozzles 32 are connected by a fuel line which extends inside a strut 34 having one end connected to the fuel nozzle 32 and the other end mounted to the casing 20 in a sealed manner. The fuel line strut 34 is exposed to the compressed air 45 which is significantly cooler than the combustion gasses inside the combustion chamber.

The liner 24 can have a large quantity of apertures formed therethrough and interspaced across its surface, allowing the controlled mass transfer of compressed air between the plenum 28 and the subchamber 26. The control of the compressed air transfer is an elaborate science which aims a plurality of objectives, and any change in the configuration of apertures can have important effects on the dynamics of combustion. One objective is to achieve a high efficiency of combustion. Another objective is to control the temperature of the liner 24. Accordingly, on many types of gas turbine engines, the liners use a plurality of small apertures interspaced from one another across the surface of the liner, which serve both to allow a regular feed of compressed air to the combustion and to cool their immediate viscinity by way of the flow of cooler air. In the illustrated embodiment, these small apertures can have a diameter in the order of 0.030" or 0.040" for instance.

Other types of apertures are used as well in the illustrated liner. For instance, conveniently positioned apertures having a diameter in the order of 0.100" can be used as nozzle cooling apertures. Moreover, in this specific embodiment, dilution holes 36 having a size of 0.5" or more are used, one set of which being positioned on the radially outer wall 38 of the liner, about midway between the fuel nozzle 32 and the outlet 30.

In this example, a laser igniter 40 is mounted to the radially-outer wall 42 of the casing 20, remotely from the combustion chamber liner 24. The laser igniter 40 is not directly mounted to the combustion chamber liner 24, but held at a relative position and orientation therefrom by the casing 20. In the depicted configuration, the laser igniter 40 has a laser emitter 39 which directs a laser beam through a focusing lens 41a which is located at an end 43 of a neck portion 44 of the laser igniter 40. The focusing lens 41a is thus exposed to the relatively cool compressed air 45 circulating in the plenum 28, and is virtually unexposed to the harsh combustion conditions occurring in the subchamber 26 during operation. In this embodiment, the end 43 of the neck is located in the plenum 28. In alternate embodiments, the end 43 of the neck can be mounted flush with the casing 20 or even recessed therein, for instance.

The laser igniter directs a laser beam along a beam path 46 which penetrates into the subchamber 26 via a beam path aperture 48 provided in the liner 24. In this embodiment, one of the dilution holes 36 is used as the beam path aperture 48. The beam path 46 is adjusted and oriented in a manner that laser energy kernels 50 of the focused laser beam path 46 occur at useful locations inside the subchamber 26 for efficient ignition. The energy kernels 50 are interspaced from one another along the beam path. During use, the fuel and later combustion products progress from the fuel nozzle, across the laser energy kernels 50, and toward the outlet 30 along a combustion path 47. With reference to a virtual reference of a dilution hole plane 49 extending transversally relative to the combustion path 47, and coinciding with a longitudinal position of the dilution hole 36 along the combustion path 47, the laser igniter 40, including the focusing lens 41a, are located on one side of the dilution hole 36, the energy kernels 50 are on the other side of the dilution hole 36, and the beam path 46 extends obliquely across the dilution hole 36. The fine tuning concerning the exact orientation of the beam path 46 and the position of the laser energy kernels 50 can be done by persons of ordinary skill in the art in the light of this disclosure.

The aperture or hole in the liner 24 through which the laser beam path 46 extends is referred to herein as the beam path aperture 48. In alternate embodiments, the position and size of the beam path aperture 48 can vary, and the location and specifics of the laser ignitor 40 can vary as well. For instance, another type of existing aperture than a dilution hole 36 could be used as the beam path aperture, or the liner could be designed with a specific aperture intended to be used as a beam path aperture and also designed with the effect upon combustion dynamics in mind. The size of the beam path aperture can be selected to be sufficiently big to maintain alignment with the laser beam path as the relative position, orientation and size of the beam path apertures varies due to thermal growth of the liner. In the embodiment illustrated and described herein, a aperture having a length of 0.5" (e.g. a surface area of 0.2 square inches, preferably above 0.5 square inches) along the cross-section of the liner was considered to be a practical minimum to allow to maintain this alignment during normal thermal growth variations.

Positioning the laser igniter remotely from the liner and orienting the laser beam path through an appropriate aperture in the liner eliminate the needs for a floating connection. Also, it avoids exposing the focusing lens, window, or other optics of the laser igniter to combustion soot which is produced in the subchamber 26 during combustion. The instant disclosure and the attached figures are intended to show one preferred example of how this can be achieved, though it will be understood that the exact configuration can vary in alternate embodiments. In the illustrated embodiment, for instance, the laser igniter has a neck 44 which protrudes into the plenum 24. It will be understood that the distance 52 between the end 43 of the neck 44 and the liner can vary in alternate embodiments. One consideration which is satisfied in the illustrated embodiment is to maintain the leak-proof characteristics of the casing at the location where the laser igniter 40 is mounted to the casing. In the embodiment illustrated in FIG. 2, the focusing lens 41a provided inside the neck 44 of the laser igniter also serves as a leak-proof (pressuretight) and optically transparent seal, which can be referred to herein as a window 41, which prevents the compressed air 45 from leaking into the laser igniter via the neck. In an alternate embodiment, for instance, the laser emitter of the laser igniter can be held at a predetermined location externally from the casing, and the casing radially outer wall can simply include a leak-proof window across which the laser beam path can extend to penetrate into the beam path aperture and into the combustion chamber. The window can have focusing properties, or the focusing lens can be provided separately from the window, for instance. The window is the last optical component which the light traverses prior to exiting the laser igniter and reaching the plenum. Still alternately, the leak-proof or pressure tight characteristics of the laser igniter can be provided by a leak-proof housing which houses the focusing optics, for instance. Other optical components can be added to orient and/or modulate the laser beam path as desired.

The above description is meant to be exemplary only, and one skilled in the art will recognize that changes may be made to the embodiments described without departing from the scope of the invention disclosed. For example, the remote configuration of the laser ignitor relative to the liner described herein and illustrated can be adapted to other types of gas turbine engines than a turbofan such as illustrated herein. Still other modifications which fall within the scope of the present invention will be apparent to those skilled in the art, in light of a review of this disclosure, and such modifications are intended to fall within the scope of the appended claims.

What is claimed is:

1. A combustor for a gas turbine engine, the combustor comprising:
   a casing forming a pressure vessel and having an inlet for receiving compressed air;
   a liner held inside the casing and delimiting a subchamber of the pressure vessel from a plenum extending between the liner and the casing, the liner having a plurality of apertures formed therethrough and allowing controlled fluid flow communication of the compressed air from the plenum into the subchamber, with at least one of the plurality of apertures being a dilution hole, and an outlet leading to a turbine stage of the gas turbine engine;
   at least one fuel nozzle mounted to the liner, for injecting fuel into the subchamber, the liner having a combustion flow path extending from the fuel nozzle to the outlet;
   at least one laser ignitor having a beam outlet, the at least one laser ignitor mounted to the casing remotely from the liner and wherein the beam outlet is positioned aft of the dilution hole in an axial direction, the at least one laser ignitor having an igniter beam path for igniting the fuel and air mixture in the subchamber, the igniter beam path extending at least partially across the plenum and into the subchamber through a corresponding one of the at least one dilution hole in the liner;
   wherein the laser ignitor is on one side of the corresponding dilution hole and the laser beam path extends into the subchamber on another side of the corresponding dilution hole relative to the combustion flow path, the igniter beam path extending obliquely across the corresponding dilution hole relative to the combustion flow path.

2. The combustor of claim 1 wherein the laser igniter has a laser emitter and a focusing lens, the focusing lens being exposed to the compressed air circulating between the casing and the liner.

3. The combustor of claim 1 wherein the at least one laser igniter includes a pressure tight window made integral to the casing, and a laser emitter located externally from the window, the laser ignitor being configured for generating a laser beam across said window, and along said igniter beam path to reach the subchamber.

4. The combustor of claim 1 wherein the at least one laser igniter is positioned remotely from the compressed air inlet and the igniter beam path is oriented partially toward the compressed air inlet.

5. The combustor of claim 1 wherein the igniter beam path has a plurality of interspaced laser energy kernels, said laser energy kernels being located in the subchamber.

6. The combustor of claim 5 wherein the energy kernels are interspaced along the igniter beam path.

7. A gas turbine engine comprising:
   a compressor section for compressing incoming air, a combustor having a casing forming a pressure vessel and having an inlet for receiving compressed air from the compressor section;
   a liner held inside the casing and delimiting a subchamber of the pressure vessel from a plenum extending between the liner and the casing, the liner having a plurality of apertures formed therethrough and allowing controlled fluid flow communication of the compressed air from the plenum into the subchamber, with at least one of the plurality of apertures being a dilution hole, and an outlet;
   at least one fuel nozzle mounted to the liner, for injecting fuel into the subchamber, the liner having a combustion flow path extending from the fuel nozzle to the outlet;
   at least one laser ignitor having a beam outlet, the at least one laser ignitor mounted to the casing remotely from the liner and wherein the beam outlet is positioned aft of the dilution hole in an axial direction, the at least one laser ignitor having an igniter beam path for igniting the fuel and air mixture in the subchamber and generating a hot stream of combustion gasses through the outlet, the igniter beam path extending at least partially across the plenum and into the subchamber through a corresponding one of the at least one dilution holes in the liner;
   wherein the laser ignitor is on one side of the corresponding dilution hole and the laser beam path extends into the subchamber on another side of the corresponding dilution hole relative to the combustion flow path, the igniter beam path extending obliquely across the corresponding dilution hole relative to the combustion flow path;
   a turbine section for extracting energy from the hot stream of combustion gasses, the turbine section being in fluid flow communication with the outlet of the combustor.

8. The gas turbine engine of claim 7 wherein the laser igniter has a laser emitter and a focusing lens, the focusing lens being exposed to the compressed air circulating between the casing and the liner.

9. The gas turbine engine of claim 7 wherein the at least one laser igniter is positioned remotely from the compressed air inlet and the igniter beam path is oriented partially toward the compressed air inlet.

10. The gas turbine engine of claim 7 wherein the igniter beam path has a plurality of interspaced laser energy kernels, said laser energy kernels being located in the subchamber.

11. The gas turbine engine of claim 10 wherein the energy kernels are interspaced along the igniter beam path.

12. A combustion chamber for a gas turbine engine, the combustion chamber comprising:
   a casing forming a pressure vessel and having an inlet for receiving compressed air;
   a liner held inside the casing and delimiting a subchamber of the pressure vessel from a plenum extending between the liner and the casing, the liner having a plurality of apertures formed therethrough and allowing controlled fluid flow communication of the compressed air from the plenum into the subchamber, with at least one of the plurality of apertures being dilution hole, and an outlet leading to a turbine stage of the gas turbine engine;

at least one fuel nozzle mounted to the liner, for injecting fuel into the subchamber, the liner having a combustion flow path extending from the fuel nozzle to the outlet;

at least one laser ignitor window made integral to the casing, at least one laser igniter emitter located externally from the laser ignitor window for generating an igniter laser beam along an igniter beam path, the laser igniter emitter having a beam outlet that is positioned aft of the dilution hole in an axial direction, the igniter beam path extending across a corresponding one of the at least one laser ignitor window, at least partially across the plenum, and into the subchamber through a corresponding one of the at least one dilution hole in the liner, the laser beam path having at least one focused energy kernel inside the subchamber for igniting the fuel and air mixture;

wherein the laser ignitor emitter is on one side of the corresponding dilution hole and the laser beam path extends into the subchamber on another side of the corresponding dilution hole relative to the combustion flow path, the igniter beam path extending obliquely across the corresponding dilution hole relative to the combustion flow path.

13. The combustor of claim 12 wherein the at least one laser emitter is positioned remotely from the compressed air inlet and the igniter beam path is oriented partially toward the compressed air inlet.

14. The combustion chamber of claim 12 wherein the igniter beam path has a plurality of laser energy kernels interspaced from one another along the igniter beam path, said laser energy kernels being located in the subchamber.

* * * * *